March 22, 1949. W. C. HEIN ET AL 2,465,018
VALVE
Filed Jan. 5, 1945 2 Sheets-Sheet 1
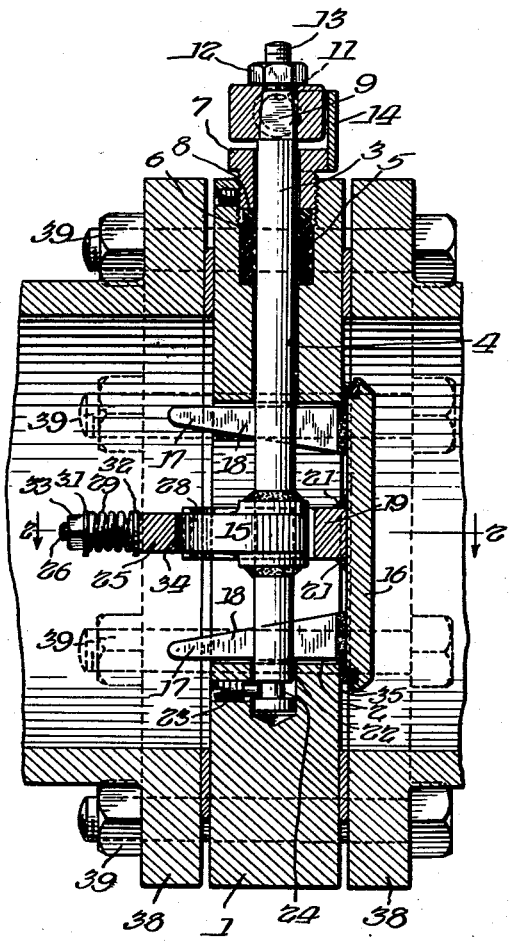
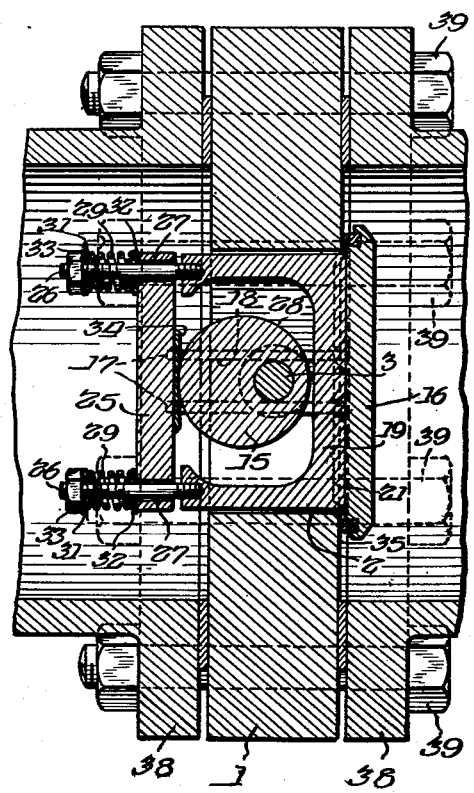
Inventors:
Willard C. Hein, &
Leonard W Winchester
By Joseph O. Lange, Atty.

March 22, 1949.　　　　W. C. HEIN ET AL　　　　2,465,018
VALVE
Filed Jan. 5, 1945　　　　　　　　　　　　2 Sheets-Sheet 2
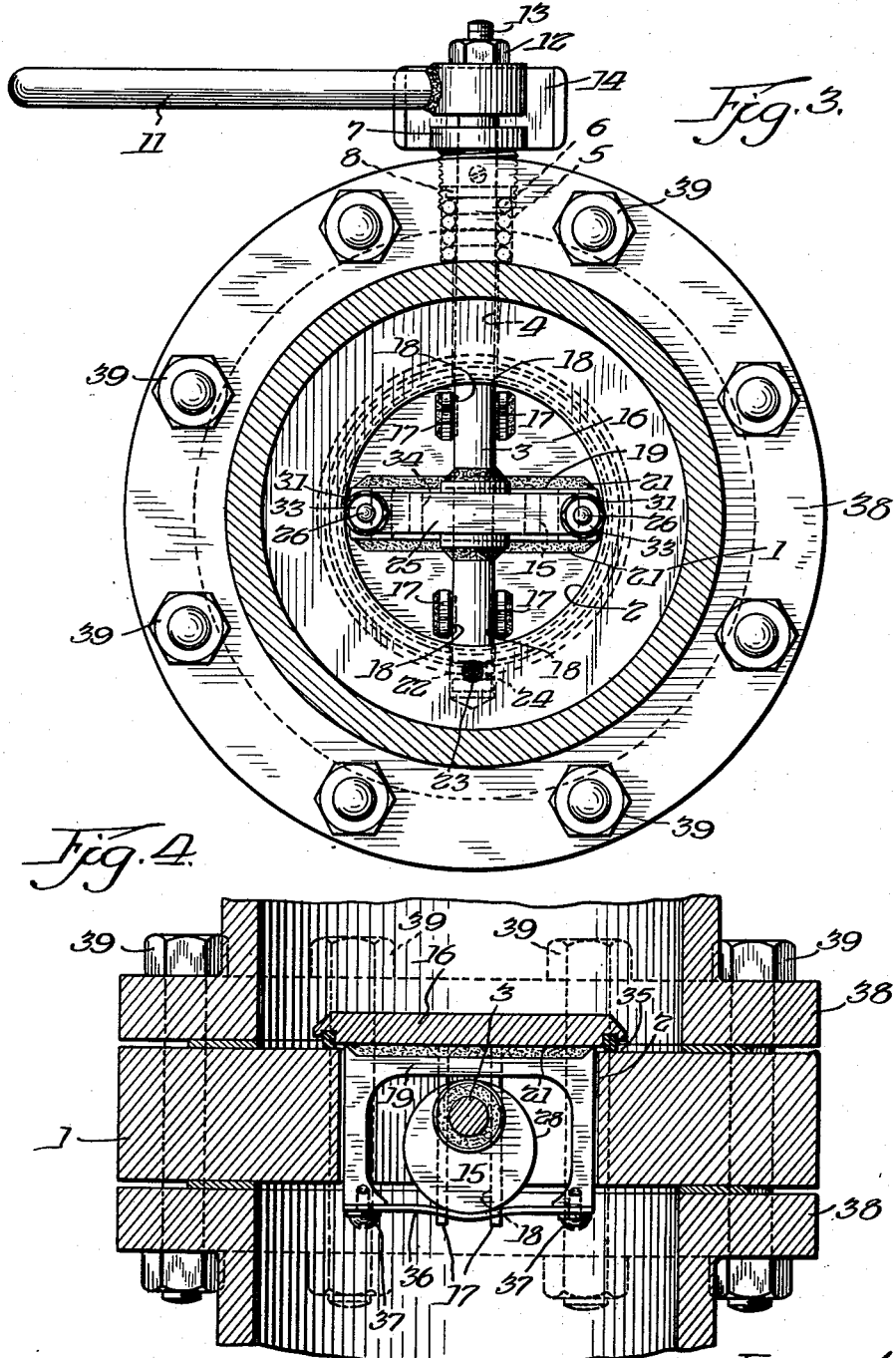

Patented Mar. 22, 1949

2,465,018

UNITED STATES PATENT OFFICE 2,465,018

VALVE

Willard C. Hein and Leonard W. Winchester, Chicago, Ill., assignors, by mesne assignments, to the United States of America as represented by the United States Atomic Energy Commission Application January 5, 1945, Serial No. 571,696

2 Claims. (Cl. 251—39)

This invention relates to a valve, and more particularly it pertains to a cam operated type of valve especially suitable for use on the more critical and severe services, as for example, as a control valve on vacuum systems.

Heretofore for the latter type of service, it has been relatively common to employ a valve construction in which a bellows was used in order to obtain tightness. However, it has been found that the bellows as a construction element is relatively weak especially when considering frequency of operation. The valve of our invention eliminates the use of a bellows construction for the services referred to, but mechanically it is comparably more efficient than many more expensive valves of a similar type. In addition it possesses the advantage of having no operating threads either on the stem or any other element of the operating mechanism. In addition it possesses the advantage over the conventional non-rising stem valves in that the stem need rotate only 180 degrees from the full open to shut position, or vice versa, thus minimizing packing wear and permitting the employment of relatively smaller amounts of packing in the stuffing box.

Another object of our invention is to provide a cam valve which is relatively compact in its construction and which will operate satisfactorily in any given position.

Another object is to provide a valve which employs a relatively simple type of casing and which may be assembled and disassembled in the pipe line with relative simplicity and convenience.

A further object of this invention is to provide a valve in which the usual type of substantial valve casing may be dispensed with and a simple flange member may be employed instead.

Another object is to provide a valve solely employing a flange as its casing and in which such flange may be easily attached and supported in a pipe line.

A further object is to provide a valve in which only the outer periphery of the flange is exposed beyond the pipe line together with a small portion of the stem and the operating mechanism.

Another object of our invention is to provide a valve of the character hereinafter described in which the stem is of the non-rising type and in which a relatively simple stuffing box structure may be used to form a substantial fluid seal.

Other objects and advantages will become more readily apparent upon proceeding with the specification read in connection with the accompanying drawings, in which Fig. 1 is a sectional assembly view of a valve substantially at its centerline.

Fig. 2 is a sectional view taken on the line 2—2 of Fig. 1.

Fig. 3 is a fragmentary front view.

Fig. 4 is a view of a modified form of closure member.

Referring now to Fig. 1, the annular member 1 is provided with the central aperture 2 which functions as a flow passage from the inlet to the outlet side of the valve. The thickness of the annular member 1 is of such proportions as determined by the size of the valve required. Transversely journaled within the annular member 1 and substantially at right angles to the horizontal axis, the stem 3 is journaled as indicated at 4. Above the journaled portion, the annular member is recessed as at 5 to provide suitable space for the stuffing box packing 6, the packing being compressed in the usual manner by a threaded stuffing nut 7 bearing against the gland 8. The end portion of the stem 3 is provided with the usual square or polygonal end 9 for receiving the handle 11 held thereto by means of the nut 12 threadedly engaging the shank 13. If desired, and for purpose of serving as a stop for the handle in its extreme positions from open to closed and return, the stuffing nut 7 may be provided with the extension 14 which may be either integral therewith or else may be attached in some suitable manner as indicated, say by brazing, or welding, or bolting. Preferably integral with the lower end portion of the stem the cam member 15 is mounted upon the stem so that it virtually lies at the center of the aperture 2. The cam 15 may be attached by soldering or welding or being pinned to the stem 3, if desired.

As indicated more clearly in Fig. 2, the cam is of eccentric circular form in its plan view and bears against the plate-like closure member 16 which is of generally circular configuration having the four spaced apart prong-like guides 17 which are bifurcated in their form as indicated at 18 in order to straddle the stem 3. A frame 19 for engagement by the cam surfaces may be made either integral with the closure member 16 or else may be welded thereto as indicated at 21. The same means of attachment is applicable to the bifurcated guides 17, which if desired may be made integral with the frame 19. At its lower portion the stem 3 is suitably journaled as indicated at 22 within the flange 1. In order to hold the stem against longitudinal movement, the pin 23 engages the grooved portion 24 of the stem, as indicated.

In order to provide a suitable cam bearing surface at both extremes of operation of the cam, a bar 25 is attached to the frame 19, the bolt studs 26 passing through the apertures 27 of the bar and preferably being resiliently supported against the cam surface 28 by means of the springs 29, the centering washers 31 and 32, and the threaded hexagon nuts 33 engaging the threads of the bolt studs 26, as indicated. It has been found desirable in some instances in order to provide improved wear properties to the surfaces between the cam and the spring bar to coat the latter member along the bearing surface with the cam, as indicated at 34, with a silver solder coating or bearing. It will now be apparent that by rotating the stem 3 in the manner desired, the cam 15 is likewise turned. By thus shifting the major and minor centers of the cam, the valve may be opened and closed by bearing against one end portion of the frame or against the spring bar 25, which being resiliently mounted allows for the closure member to be seated with a predetermined load controlled by means of the compression placed upon the springs 29. Thus the degree of contact of the closure member with its seat 35 is nicely adjustable. The closure member 16, if desired, may be provided with a rubber or other resilient ring having a frusto-conical cross-section, enabling the closure member to maintain a more desirable type of sealing contact with the seat 35.

It will of course be apparent that in order to accomplish the desired resiliency between the spring bar 25 and the cam 28, it is not necessary to use a coiled spring arrangement, as indicated in Figs. 1 and 2. Instead, as shown in Fig. 4, a spring steel member 36 may be used, bolted by means of the bolts 37 to the frame 19.

As indicated by the flanges 38 shown fragmentarily, the latter may be suitably attached to a pipe line (not shown) by means of the bolts 39 although other attaching means may be used, as for example, by direct welding.

From the foregoing description it should be clear that a relatively simple and yet highly efficient type of valve construction has been designed, eliminating particularly the conventional form of bulky valve casing with its expensive coring and objectionable requirements of considerable space in a pipe line. The valve may be quickly opened and closed to a wide open position or a fully closed position with a turn of the handle of only 180 degrees. The motion or travel of the disc is finely controlled by the cam which may be either welded or pinned to the stem, and the disc in the open position is guided at a plurality of points around the circumference of the disc, and with all of these advantages it is relatively simple and inexpensive to construct.

It will of course be apparent to those skilled in the art that the specific details of construction of the invention may vary substantially from those forms illustrated and described without departing from the spirit of the invention. Therefore, it is not the desire to be limited to the above disclosures except as may be required by the appended claims, considering the condition of the prior art.

We claim:

1. In a valve of the character described, a substantially annular housing therefor, a reciprocably movable closure member seating on an exterior face of said housing, a central passage through said housing, a transversely extending stem intercepting the central passage, a pair of bifurcated guides secured to and reciprocable with said closure, said guides extending within the housing passage and straddling said stem at opposite sides of said passage, a substantially U-frame member secured to and reciprocable with said closure member and extending within said housing, studs carried by said frame, a bar member carried by said studs, spring means carried by said studs and arranged to urge said bar member towards said frame, means for adjusting the compression of said spring means whereby the compression between the closure member and the exterior face of said housing is adjustable to a predetermined pressure, and a cam member on said stem engageable with said bar member, whereby upon rotation of the stem the closure member is reciprocably moved relative to the seating face on the housing.

2. In a valve of the character described, a substantially annular housing therefor, a reciprocably movable closure member seating on an exterior face of said housing, a central passage through said housing, a transversely extending stem intercepting the central passage, a pair of bifurcated guides secured to and reciprocable with said closure, said guides extending within the housing passage and straddling said stem at opposite sides of said passage, a substantially U-frame member secured to and reciprocable with said closure member and extending within said housing, studs carried by said frame, a bar member carried by said studs, a silver solder coating on said bar member, spring means carried by said studs and arranged to urge said bar member towards said frame, means for adjusting the compression of said spring means whereby the compression between the closure member and the exterior face of said housing is adjustable to a predetermined pressure, and a cam member engageable with the silver solder coated surface of said bar member, whereby upon rotation of the stem the closure member is reciprocably moved relative to the seating face on the housing.

WILLARD C. HEIN.
LEONARD W. WINCHESTER.

REFERENCES CITED

The following references are of record in the file of this patent:

UNITED STATES PATENTS

| Number | Name | Date |
|---|---|---|
| 806,970 | Gold | Dec. 12, 1905 |
| 2,267,057 | Verner | Dec. 23, 1941 |
| 2,283,076 | Mattimore | May 12, 1942 |

FOREIGN PATENTS

| Number | Country | Date |
|---|---|---|
| 631,216 | Germany | 1931 |
| 715,719 | France | 1936 |